United States Patent
Suyama et al.

(10) Patent No.: US 10,312,068 B2
(45) Date of Patent: Jun. 4, 2019

(54) CHARGED PARTICLE DETECTOR

(71) Applicant: HAMAMATSU PHOTONICS K.K., Hamamatsu-shi, Shizuoka (JP)

(72) Inventors: Motohiro Suyama, Hamamatsu (JP); Hiroshi Kobayashi, Hamamatsu (JP); Shinya Hattori, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 15/740,164

(22) PCT Filed: Jun. 30, 2016

(86) PCT No.: PCT/JP2016/069496
§ 371 (c)(1),
(2) Date: Dec. 27, 2017

(87) PCT Pub. No.: WO2017/002936
PCT Pub. Date: Jan. 5, 2017

(65) Prior Publication Data
US 2018/0174810 A1    Jun. 21, 2018

(30) Foreign Application Priority Data
Jul. 2, 2015  (JP) ................... 2015-133538

(51) Int. Cl.
*G01T 1/24*  (2006.01)
*G01T 1/28*  (2006.01)
*H01J 43/24*  (2006.01)
*H01J 49/02* (2006.01)
*H01J 49/06* (2006.01)

(52) U.S. Cl.
CPC ............ *H01J 49/025* (2013.01); *G01T 1/241* (2013.01); *G01T 1/28* (2013.01); *H01J 43/24* (2013.01); *H01J 49/067* (2013.01); *H01J 49/06* (2013.01)

(58) Field of Classification Search
None
See application file for complete search history.

(56) References Cited

U.S. PATENT DOCUMENTS

| | | | |
|---|---|---|---|
| 5,326,978 | A | 7/1994 | Aebi et al. |
| 2008/0121796 | A1 | 5/2008 | Green et al. |

FOREIGN PATENT DOCUMENTS

| | | |
|---|---|---|
| CN | 103227097 A | 7/2013 |
| CN | 103730323 A | 4/2014 |
| JP | H07-73847 A | 3/1995 |

(Continued)

OTHER PUBLICATIONS

International Preliminary Report on Patentability dated Jan. 11, 2018 for PCT/JP2016/069496.

*Primary Examiner* — Edwin C Gunberg
(74) *Attorney, Agent, or Firm* — Drinker Biddle & Reath LLP

(57) ABSTRACT

A charged particle detector according to the embodiment is provided with an MCP and a PD arranged with a focus electrode interposed therebetween in order to improve a response characteristic as compared to a conventional one in a configuration in which the MCP having a bias angle and the PD are combined. The MCP includes a plurality of through holes each inclined by a bias angle θ and the PD is eccentrically arranged such that a center of an electron incident surface deviates by a predetermined distance in a bias angle direction S3 with respect to a central axis AX1 of the MCP.

18 Claims, 13 Drawing Sheets

(56) References Cited

FOREIGN PATENT DOCUMENTS

| | | |
|---|---|---|
| JP | 2004-502276 A | 1/2004 |
| JP | 2007-535104 A | 11/2007 |
| JP | 2011129362 A | 6/2011 |
| JP | 2014-78388 A | 5/2014 |
| WO | WO-02/01599 A2 | 1/2002 |
| WO | WO-2005/104178 A2 | 11/2005 |

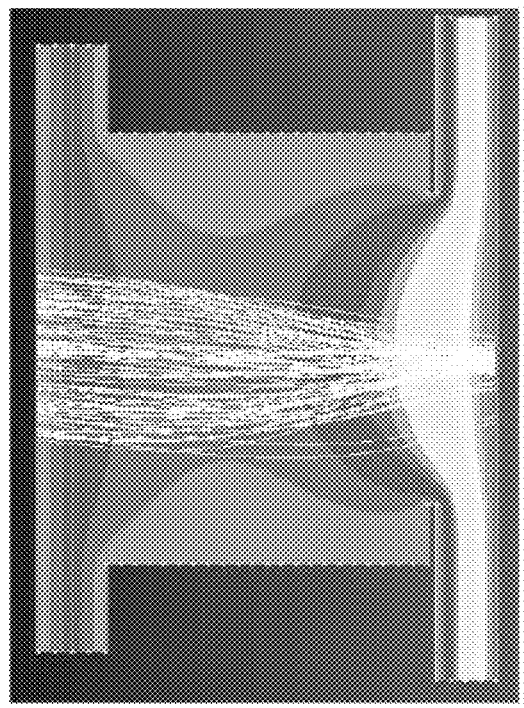
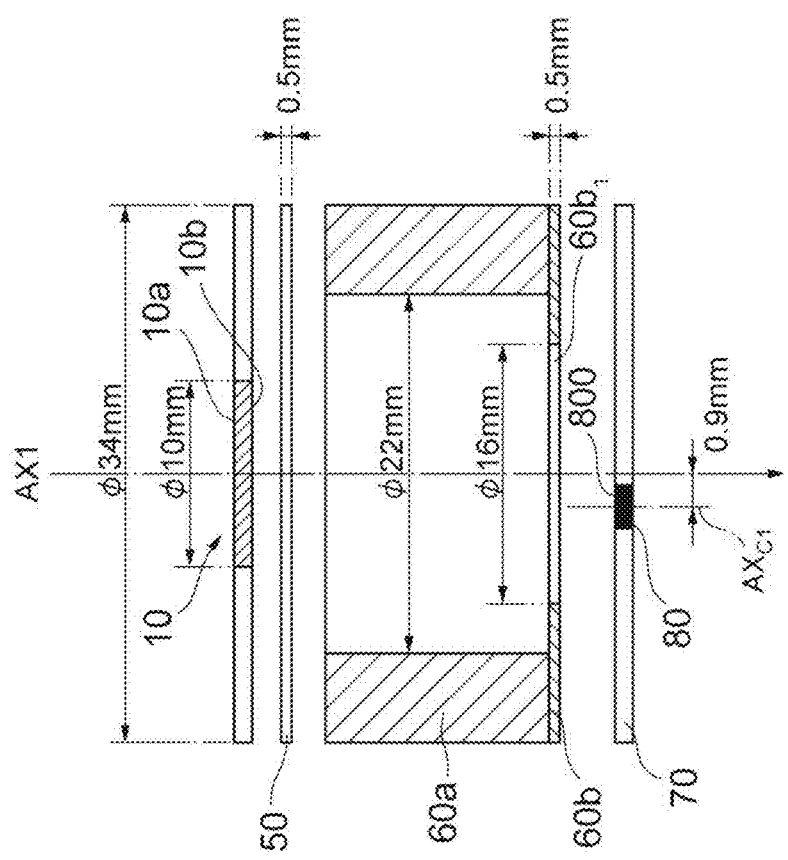
Fig.9A
Fig.9B

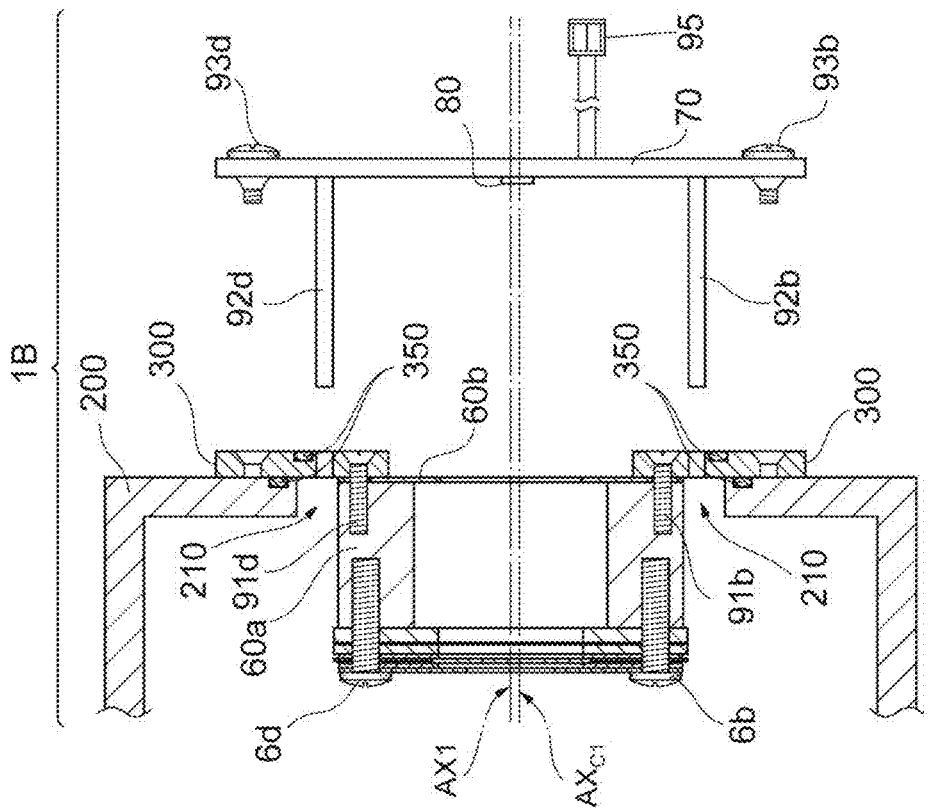
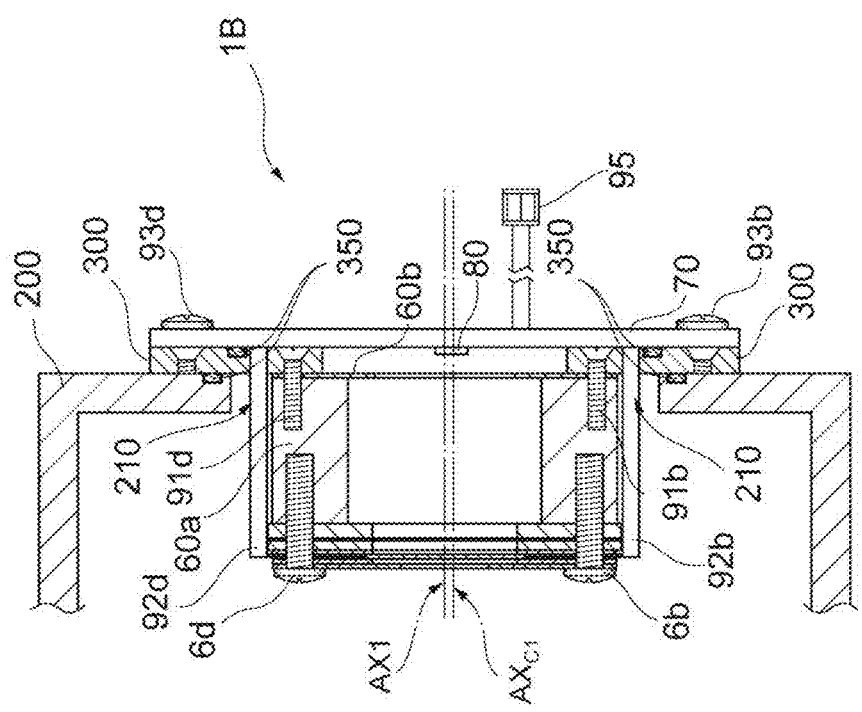
Fig. 13A
Fig. 13B

CHARGED PARTICLE DETECTOR

TECHNICAL FIELD

The present invention relates to a charged particle detector arranged in a vacuum chamber of a mass spectroscope and the like for detecting ions and electrons.

BACKGROUND ART

As a configuration of a charged particle detector applicable to a mass spectroscope and the like, for example, an ion detector, a configuration to which an electron multiplier tube is applied, a configuration to which a microchannel plate (hereinafter referred to as MCP) is applied, a configuration obtained by combining the MCP and an electron impact diode and the like are known. Especially, the configuration obtained by combining the MCP and the electron impact diode is characterized by its long device life and large maximum output current. On the other hand, a time response characteristic thereof greatly depends on a size of the electron impact diode (an area of an electron incident surface).

Following Patent Document 1 discloses the ion detector formed of the MCP, a focusing ring, and the electron impact diode is disclosed as the ion detector as described above. In the MCP applied to such ion detector, a plurality of channels arranged in parallel in a state of being inclined by a bias angle of approximately 1 to 2 degrees is provided.

In contrast, following Patent Document 2 discloses a time-of-flight mass spectrometer array device provided with an MCP detector including a center hole for a laser applied to a sample and a pin anode arranged in a position deviated from the center hole of the MCP.

CITATION LIST

Patent Literature

Patent Document 1: Japanese Patent Application Laid-Open No. H07-073847
Patent Document 2: Japanese Translation of PCT International Application Laid-Open No. 2004-502276

SUMMARY OF INVENTION

Technical Problem

As a result of examining the conventional charged particle detector, the inventors found the following problems. That is, although Patent Document 1 described above discloses the MCP in which each channel is inclined by the bias angle, as is understood from an example of electron trajectories illustrated in FIG. 3, there is neither disclosure nor suggestion of a problem concerning focusing of the electron trajectories due to the bias angle of the MCP. In addition, in Patent Document 2 described above, the pin anode is eccentrically arranged with respect to a central axis of the MCP due to presence of the center hole provided for laser irradiation; however, this Patent Document 2 neither discloses nor suggests the problem concerning the focusing of the electron trajectories due to the bias angle of the MCP. Therefore, in the conventional charged particle detector, an influence of the bias angle set in the MCP on the electron trajectories is not examined at all.

The bias angle of the MCP is an inclination angle of the channel provided for preventing incident charged particles from passing through the MCP without impacting an inner wall of each channel. Conventionally, since the MCP is applied to imaging in most cases, naturally, the above-mentioned problem is not recognized.

In addition, although the electron impact diode applied to the conventional ion detector includes a photodiode, an avalanche photodiode and the like, unlike an ordinary photodiode, this is characterized in that an oxide film (passivation film) formed on a surface thereof is extremely thin or there is no oxide film formed. In this specification, the "electron impact diode" is hereinafter simply referred to as PD. Although a capacity of the PD decreases as the electron incident surface decreases, the influence of the bias angle of the MCP on the electron trajectories is not taken into consideration in the conventional ion detector, so that it is difficult to downsize the PD, and as a result, there is also a problem that a sufficient response characteristic cannot be obtained. Meanwhile, according to the findings of the inventors, it is found that the trajectories of the electrons emitted from the MCP, especially a position of a focusing spot of the electrons vary depending on an initial speed of the electrons emitted in a bias angle direction described below.

The present invention is achieved to solve the above-described problems, and an object thereof is to provide a charged particle detector to which the combination of the MCP having a predetermined bias angle and the electron impact diode is applied, the charged particle detector having a structure for improving the response characteristic as compared to that of the conventional particle detector.

Solution to Problem

In a configuration to which a combination of an MCP and a PD is applied, in order to obtain a sufficient response characteristic, it is preferable to decrease an electron incident surface (effective area) in the PD. Therefore, in order to focus trajectories of electrons emitted from the MCP on a small PD, an electrostatic lens (focus electrode) is required.

In order to achieve the above-described object, a charged particle detector according to the present embodiment is at least provided with the MCP having a predetermined bias angle, the PD, and the focus electrode, and realizes a structure to which a smaller PD (diode including smaller electron incident surface) may be applied. That is, the MCP has: an input surface on which charged particles are incident; an output surface from which secondary electrons are emitted; and a plurality of through holes (channels) each communicating the input surface with the output surface. Each through hole having a secondary electron emission surface on an inner wall thereof is arranged such that a central axis thereof is inclined by at least a bias angle defined by an acute angle with respect to the output surface. The PD has the electron incident surface arranged so as to face the MCP having an area smaller than an area of an effective region of the MCP. The focus electrode provided between the MCP, and the PD has: a first opening located on an MCP side; a second opening located on a PD side; and has a shape continuously surrounding the trajectories of the secondary electrons traveling from the MCP to the PD. Meanwhile, in this specification, "bias angle" is intended to mean an angle (acute angle) formed by a reference axis orthogonal to the output surface of the MCP and the central axis of each through hole, and each through hole is arranged so as to be inclined with respect to the output surface of the MCP in order to prevent the incident charged particles from passing through the MCP without impacting the inner wall of each of the through holes.

As described above, in a case of the charged particle detector constituted by the combination of the MCP and the PD, electron multiplication of approximately 1000 times in the MCP and the electron multiplication of approximately 1000 times that of the MCP in the PD become possible. Since the electron multiplication is performed by the combination of the MCP and the PD in this manner, there is an effect that a dynamic range is expanded. Since the electron multiplication in the PD is performed inside the PD, an electron multiplication factor never decreases due to contamination of a surface (contamination of the electron incident surface).

Especially, in a first aspect according to the present embodiment, the electron incident surface of the PD is eccentrically arranged in a bias angle direction with respect to a central axis of the MCP. Specifically, the "bias angle direction" is defined on a reference plane coincident with the electron incident surface of the PD, by a direction from an intersection between the reference axis and the reference plane to an intersection between a central axis of a reference through hole and the reference plane, the reference axis passing through a center of an opening coincident with the output surface of the MCP out of openings of the reference through hole and orthogonal to the output surface and the reference plane to an intersection between a central axis of the reference through hole and the reference plane, the reference through hole selected from the plurality of through holes. At that time, the PD is eccentrically arranged such that a center of the electron incident surface deviates by a predetermined distance in the bias angle direction, with respect to an intersection between the central axis of the MCP and the reference plane, the central axis of the MCP being the axis passing through a center of the effective region of the MCP and orthogonal to the output surface.

Also, in a second aspect according to the present embodiment, instead of eccentricity of the PD, at least a part of the focus electrode such as an emitting end opening (second opening) of the focus electrode, for example, is eccentrically arranged in the bias angle direction, with respect to the central axis of the MCP. Specifically, at least a part of the focus electrode is eccentrically arranged such that a center of the second opening of the focus electrode deviates by a predetermined distance in the bias angle direction, with respect to the intersection between the central axis of the MCP and the reference plane, the central axis of the MCP being the axis passing through the center of the effective region and orthogonal to the output surface.

As a third aspect applicable to the above-described first or second aspect, the focus electrode may be set to have the same potential as the output surface of the MCP. As a fourth aspect applicable to at least any one of the above-described first to third aspects, the focus electrode may be set to have the same potential as the electron incident surface of the PD. According to the third and fourth aspects, by making the potential of the focus electrode the same as the potential of the output surface of the MCP or the PD, it becomes possible to drive the charged particle detector with smaller power (simplification of a feeding structure).

As a fifth aspect applicable to at least any one of the above-described first to fourth aspects, the charged particle detector may further be provided with a mesh electrode provided between the MCP and the focus electrode.

As a sixth aspect applicable to at least any one of the above-described first to fifth aspects, it is preferable that a maximum width of the electron incident surface in the PD is 3 mm or shorter. On the other hand, as a seventh aspect applicable to at least any one of the first to sixth aspects, a spot diameter of the secondary electrons reaching the electron incident surface of the PD from the output surface of the MCP is 1 mm or shorter.

Meanwhile, as an eighth aspect applicable to at least any one of the above-described first to seventh aspects, the focus electrode may be constituted by: a body portion continuously surrounding the trajectories of the secondary electrons directed from the MCP to the PD; and a flange member for defining a center position and a size of the second opening. As a ninth aspect applicable to at least any one of the above-described first to eighth aspects, it is preferable that the body portion is constituted by a plurality of hollow members sequentially arranged from the MCP to the PD. Furthermore, as a tenth aspect applicable to at least any one of the above-described first to ninth aspects, the charged particle detector may be further provided with a board on a main surface of which an electron impact diode is mounted, and a resin flange having an opening for allowing passage of the secondary electrons directed from the MCP to the PD, resin flange being arranged between the focus electrode and the board.

Meanwhile, the embodiments according to the present invention may be more sufficiently understood by the following detailed description and the accompanying drawings. The examples are given for illustrative purposes only and should not be considered as limiting the present invention.

A further application range of the present invention becomes clear from the following detailed description. Although the detailed description and specific examples describe preferred embodiments of the invention, they are given by way of illustration only, and it is clear that various modifications and improvements within the scope of the present invention are obvious to those skilled in the art from the detailed description.

Advantageous Effects of Invention

According to the present embodiment, even in a case where trajectories of secondary electrons are eccentric due to a bias angle of an MCP, a PD is eccentrically arranged with respect to the central axis of the MCP, or a center of an emitting end opening of a focus electrode is eccentrically arranged, so that it is possible to use a smaller PD (for example, a maximum width of an electron incident surface is 3 mm or shorter), and as a result, a high-speed response of the charged particle detector may be realized.

Furthermore, in the configuration described above, electron multiplication is performed in both the MCP and the PD, so that a gain of the MCP may be lowered and further improvement in linearity may be realized. In addition, this is also effective for the MCP with a large bias angle set, and improvement in mass resolution (reduction in jitter) may also be expected.

BRIEF DESCRIPTION OF DRAWINGS

FIGS. 9A and 9B are views illustrating a specific structure and a simulation result of the trajectories of the secondary electrons for an example of the charged particle detector according to the first embodiment.

FIGS. 13A and 13B are views for illustrating a cross-sectional structure of a charged particle detector according to a third embodiment.

DESCRIPTION OF EMBODIMENTS

Hereinafter, various embodiments of a charged particle detector according to the present invention are described in detail with reference to the attached drawings. Meanwhile, in the description of the drawings, the same reference sign is assigned to the same elements and the description thereof is not repeated. Furthermore, the present invention is not limited to these illustrations, but it is intended that this is disclosed by the scope of claims and that equivalents of the scope of claims and all modifications within the scope are included therein.

Figure 1:
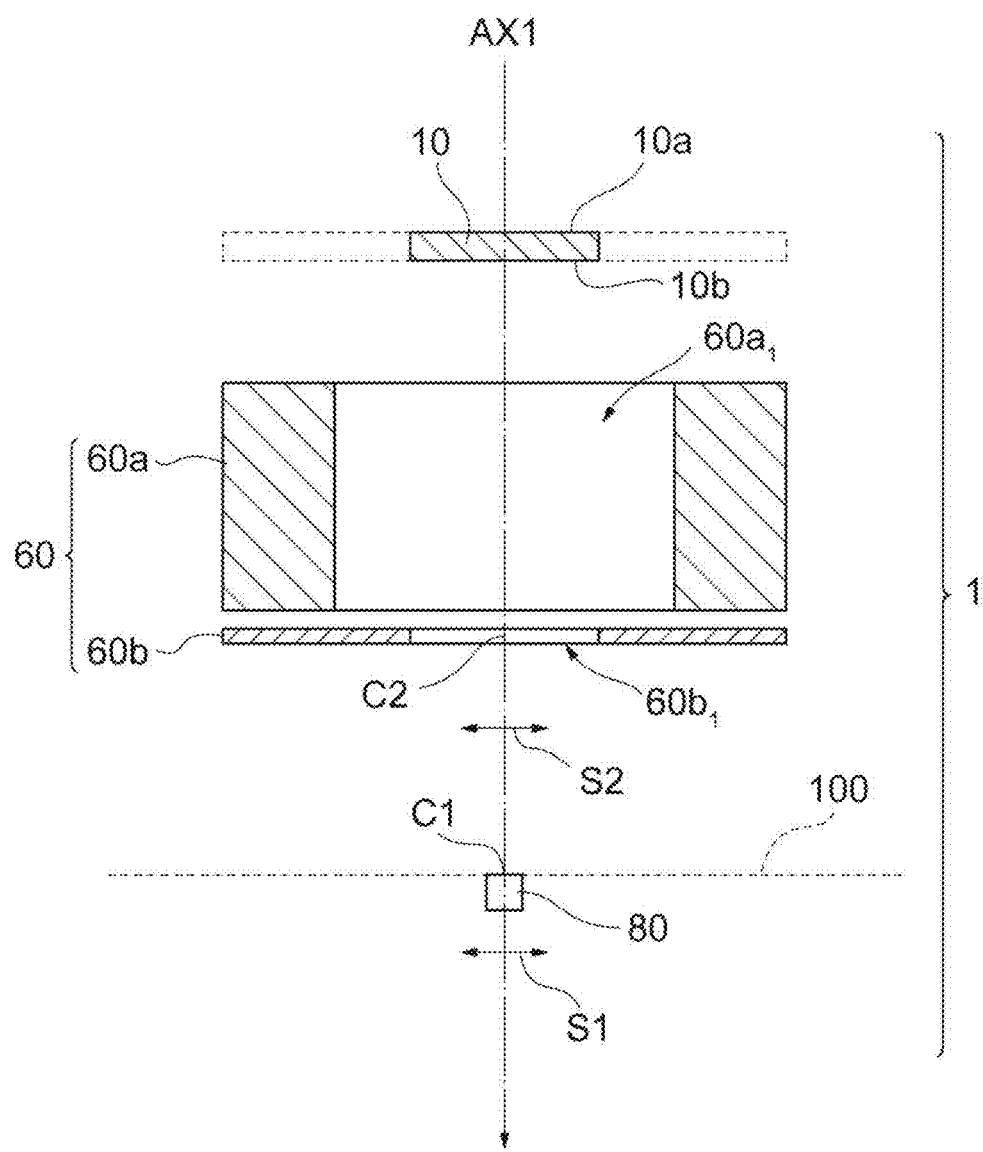
FIG. 1 is a view for illustrating a schematic configuration and an operation principle of a charged particle detector according to the present embodiment.

FIG. 1 is a view for illustrating a schematic configuration and an operation principle of a charged particle detector according to the present embodiment. In FIG. 1, a charged particle detector 1 according to the present embodiment is provided with a microchannel plate (MCP) 10, an electron impact diode (PD) 80 which receives secondary electrons outputted from the MCP 10, and a focus electrode 60 for focusing trajectories of the secondary electrons emitted from the MCP 10 provided between the MCP 10 and the PD 80. The MCP 10 includes an input surface 10a which incident charged particles reach, an output surface 10b which emits the secondary electrons generated in response to the incident charged particles, and a plurality of through holes arranged in parallel in a state inclined by a predetermined bias angle. The focus electrode 60 is formed of a hollow body portion 60a and a flange portion 60b set to have the same potential. The hollow body portion 60a includes a through hole $60a_1$ for focusing the trajectories of the secondary electrons in the vicinity of a central axis AX1 of the MCP 10. The flange portion 60b includes an opening $60b_1$ for adjusting a spot diameter of a focusing spot of the secondary electrons reaching a reference plane 100 coincident with an electron incident surface of the PD 80.

Figure 7A:
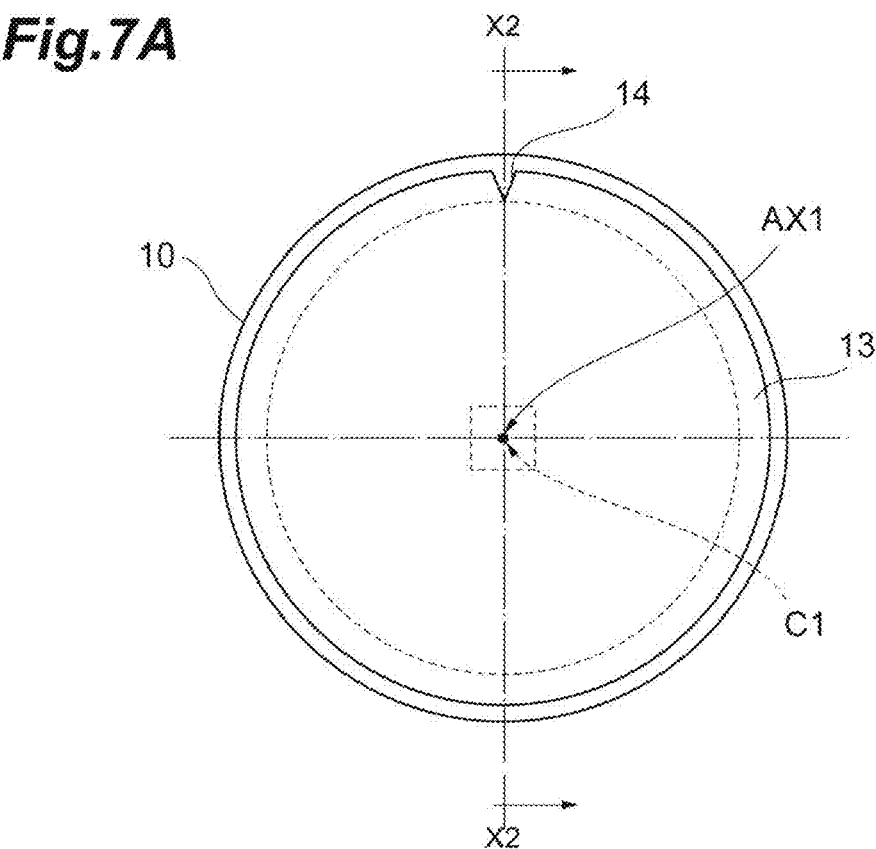
FIGS. 7A and 7B are views illustrating a positional relationship between an MCP and a PD and equipotential lines and trajectories of secondary electrons in a space between the MCP and the PD in a charged particle detector according to a comparative example.
Figure 7B:
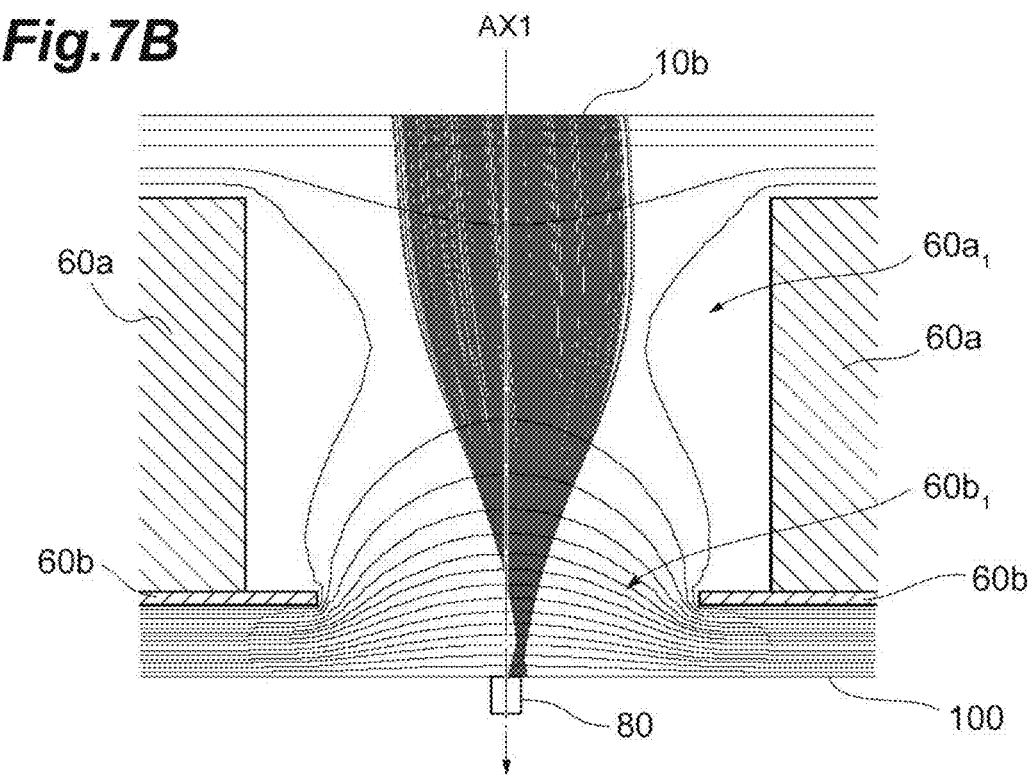

In the above-described device configuration, a position of the focusing spot of the secondary electrons on the reference plane 100 deviates from the central axis AX1 of the MCP 10 depending on the bias angle of the MCP 10. That is, in the configuration in which the PD 80 is arranged such that a center C1 of the electron incident surface is located on the central axis AX1 of the MCP 10, as illustrated in FIGS. 7A and 7B, for example, a part of the secondary electrons emitted from the MCP 10 cannot reach the electron incident surface of the PD 80. Therefore, in a case where an influence of the bias angle of the MCP 10 on the electron trajectories is not taken into consideration, it is difficult to downsize the PD 80.

In the present embodiment, while taking the above-described influence of the bias angle of the MCP 10 on the electron trajectories into consideration, a configuration in which the PD 80 is eccentrically arranged in a bias angle direction indicated by arrow S1 in FIG. 1 along the reference plane 100, and/or a configuration in which a center C2 of the opening $60b_1$ of the flange portion 60b is eccentrically arranged in a bias angle direction indicated by arrow S2 in FIG. 1 are/is adopted.

Figure 2:
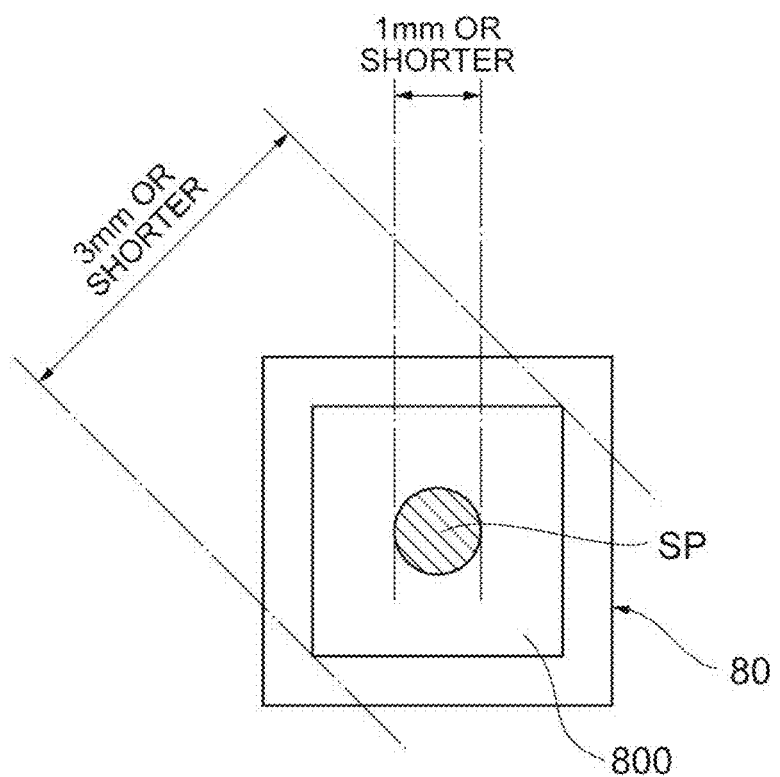
FIG. 2 is a view for illustrating a relationship between an electron incident surface of a PD and a spot diameter of secondary electrons on the electron incident surface (a region size on the electron incident surface which the secondary electrons reach).

FIG. 2 is a view for illustrating a relationship between an electron incident surface 800 of the PD 80 and a spot diameter of a focusing spot SP of the secondary electrons on the electron incident surface 800. In the present embodiment, the PD 80 (the center C1 of the electron incident surface 800) and/or the center C2 of the opening $60b_1$ of the flange portion 60b are/is eccentrically arranged in the bias angle direction defined by the bias angle of the MCP 10 with respect to the central axis AX1 of the MCP 10, so that the PD 80 itself may be downsized. Therefore, in the present embodiment, a maximum width of the electron incident surface 800 in the PD 80 is 3 mm or shorter, and preferably 1 mm or shorter. A maximum spot diameter of the focusing spot SP of the secondary electrons is 1 mm or shorter.

Next, a specific configuration, the bias angle, and the bias angle direction of the MCP 10 applied to the charged particle detector 1 according to the present embodiment are described in detail with reference to FIGS. 3A to 4B. Meanwhile, FIG. 3A is a perspective view for illustrating a structure of the MCP 10, and FIG. 3B is a cross-sectional view of the MCP 10 as seen in a direction indicated by arrow A in FIG. 3A.

Figure 3A:
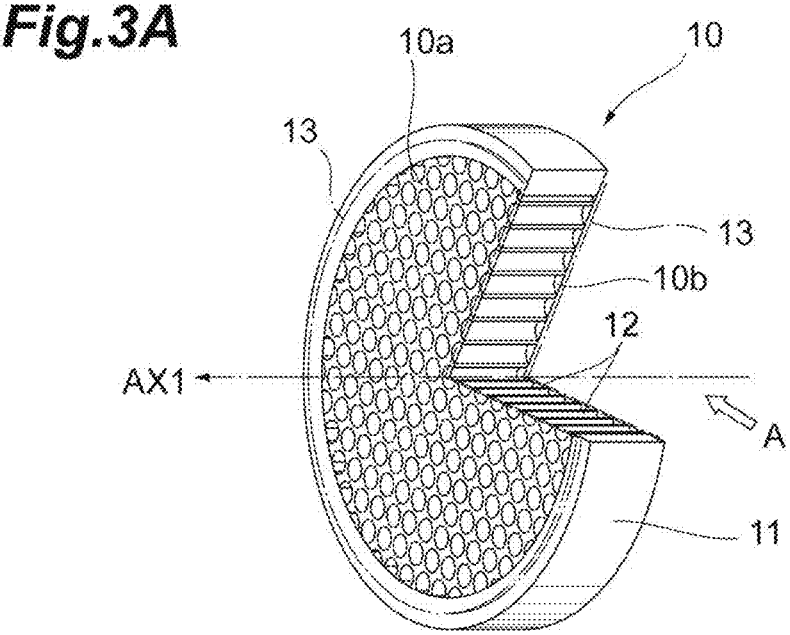
FIGS. 3A and 3B are views for illustrating a structure of an MCP applicable to the charged particle detector according to the present embodiment.

As illustrated in FIG. 3A, the MCP 10 is known as an electron multiplying element provided with a plate-shaped structure (main body) in which a plurality of channels is regularly arranged. That is, the MCP 10 is a thin disk-shaped structure (main body) of which main component is lead glass in which a plurality of through holes 12 extending in a thickness direction (direction from the input surface 10a to the output surface 10b) is arranged except for an annular outer peripheral portion 11 with electrodes 13 formed on both surfaces of the structure by vapor deposition. The electrode 13 does not cover an entire surface of the MCP 10 but is formed such that the outer peripheral portion 11 of the MCP 10 is exposed by 0.5 mm to 1.0 mm from an outer peripheral end.

Figure 3B:
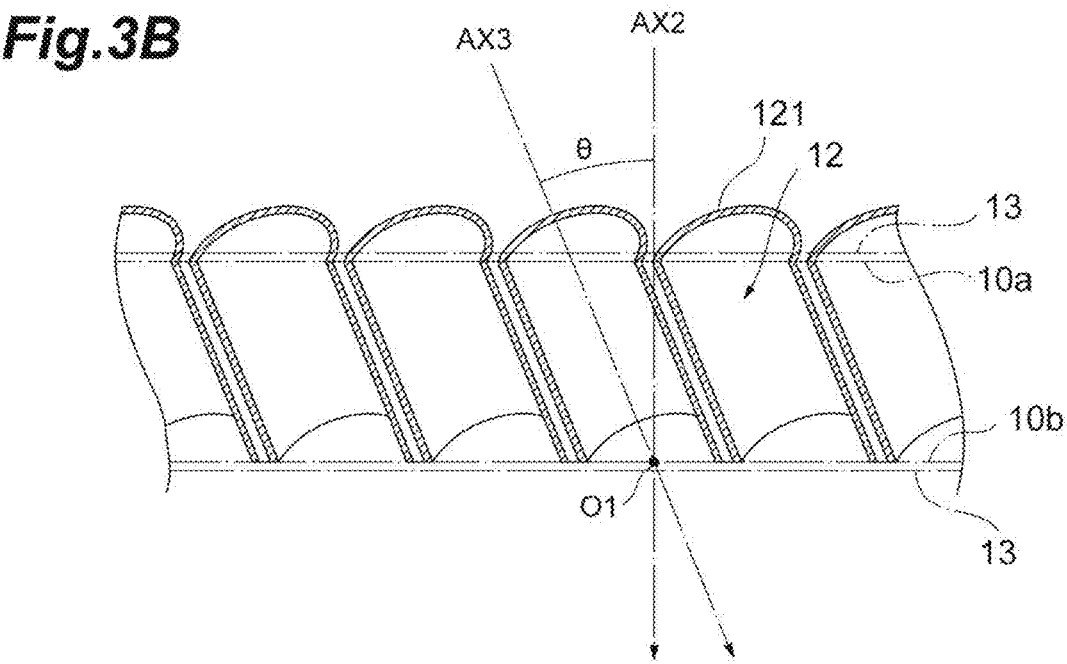

As illustrated in FIG. 3B, a plurality of through holes 12 is arranged in parallel in a state inclined by a predetermined bias angle with respect to the output surface 10b of the MCP 10, and a secondary electron emission surface 121 is formed on an inner wall (channel wall) surface of each of them. The "bias angle" is defined by a reference axis AX2 perpendicular to the output surface 10b of the MCP 10 and a central axis AX3 of each through hole 12. That is, as for the through hole selected from a plurality of through holes 12 (a reference through hole), when the reference axis AX2 passing through a center O1 of an opening coincident with the output surface 10b out of the openings of the reference through holes is defined, an acute angle formed by the reference axis AX2 and the central axis AX3 of the reference through hole intersecting with the same at the opening center O1 is a bias angle θ.

Figure 4A:
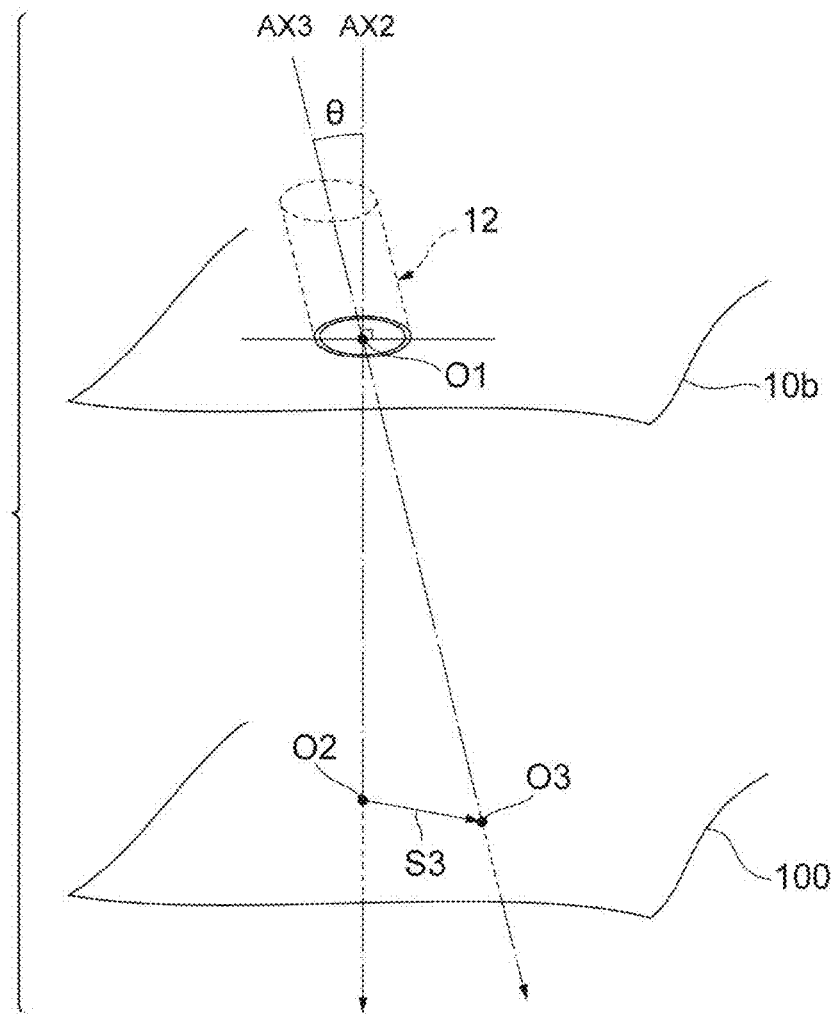
FIGS. 4A and 4B are views for illustrating a bias angle direction.

Furthermore, the bias angle direction is specified on the basis of the bias angle θ of the MCP 10 defined in the above-described manner. Specifically, as illustrated in FIG. 4A, on the reference plane 100 coincident with the electron incident surface 800 of the PD 80, an intersection between the reference axis AX2 passing through the center O1 of the opening coincident with the output surface 10b of the MCP 10 out of the openings of the reference through hole and orthogonal to the output surface 10b and the reference plane 100 is defined as O2. An intersection between the central axis AX3 of the reference through hole and the reference plane 100 is defined as O3. At that time, a direction indicated by arrow S3 from the intersection O2 to the intersection O3 on the reference plane 100 is the bias angle direction.

Specifically, when the PD 80 is made eccentric with respect to the central axis AX1 of the MCP 10, this is realized by moving the center C1 of the electron incident surface 800 of the PD 80 with respect to the central axis AX1 of the MCP 10 in the bias angle direction S3 defined as described above. Also, when the opening $60b_1$ of the flange portion 60b is made eccentric with respect to the central axis AX1 of the MCP 10, this is realized by moving the center C2 of the opening $60b_1$ of the flange portion 60b with respect to the central axis AX1 of the MCP 10 in the bias angle direction S3 defined as described above.

Figure 4B:
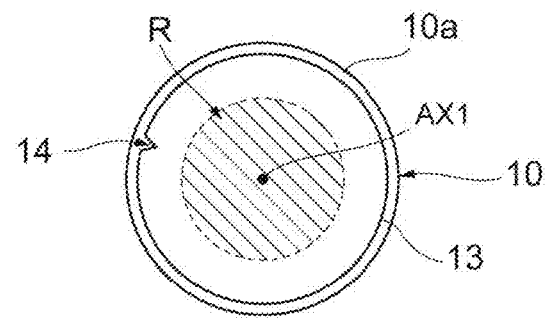

Meanwhile, in the present embodiment, in order to enable confirmation of the bias angle direction defined by the bias angle θ of the MCP 10 when assembling the charged particle detector 1, as illustrated in FIG. 4B, the MCP 10 is provided with a marker 14 indicating the bias angle direction. FIG. 4B is a plan view of the MCP 10 when the MCP 10 is seen from the input surface 10a. In the plan view of FIG. 4B, a direction from a tip of the marker 14 to the center of the MCP 10 (an intersection between the central axis AX1 and the input surface 10a) is the bias angle direction. In FIG. 4B, a hatched region R is an effective region of the MCP 10 on which the charged particles may incident, and in the present embodiment, the PD whose area is smaller than an area of the effective region R is applied.

(First Embodiment)

Figure 5:
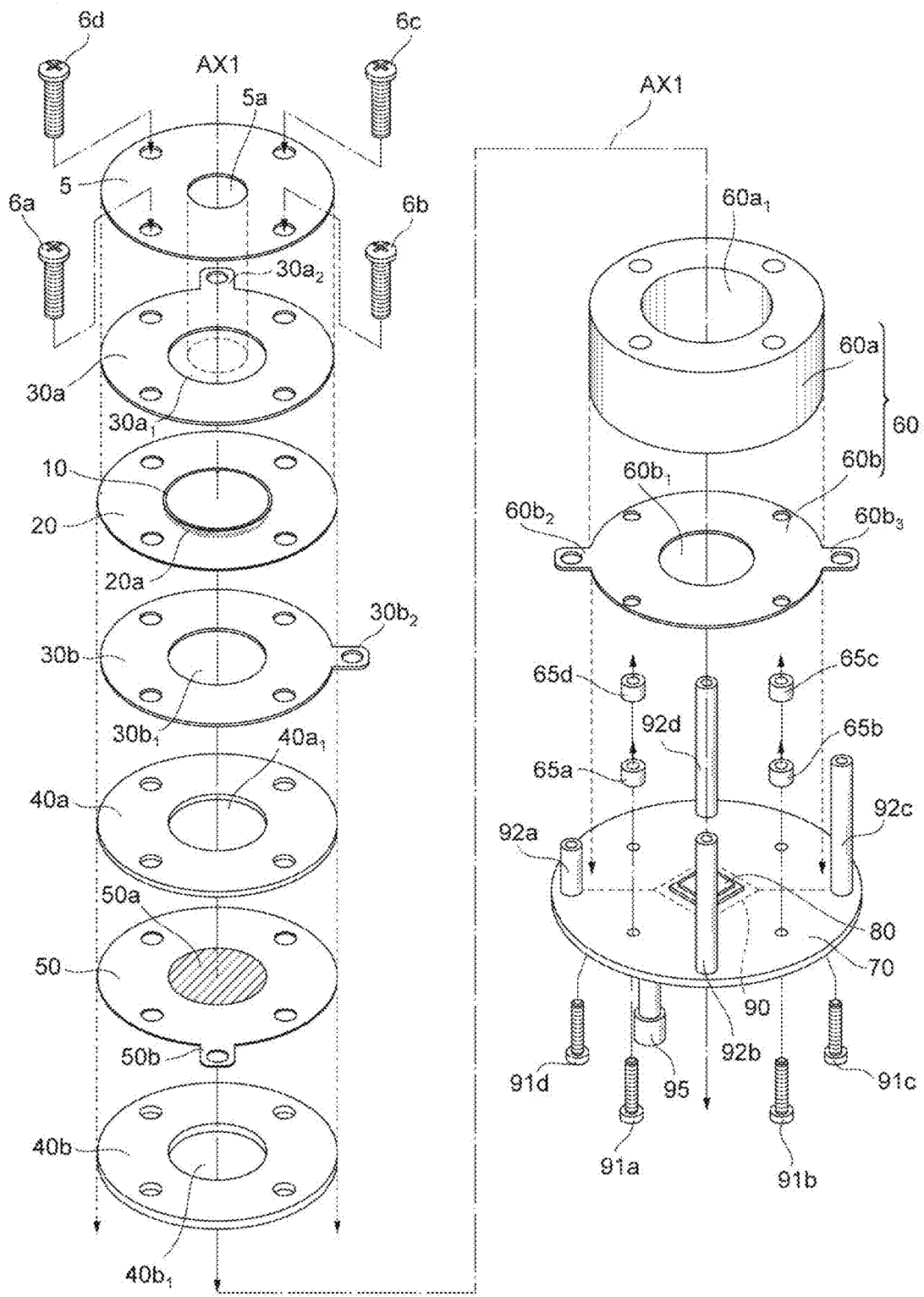
FIG. 5 is an assembly process chart of the charged particle detector according to a first embodiment.
Figure 6A:
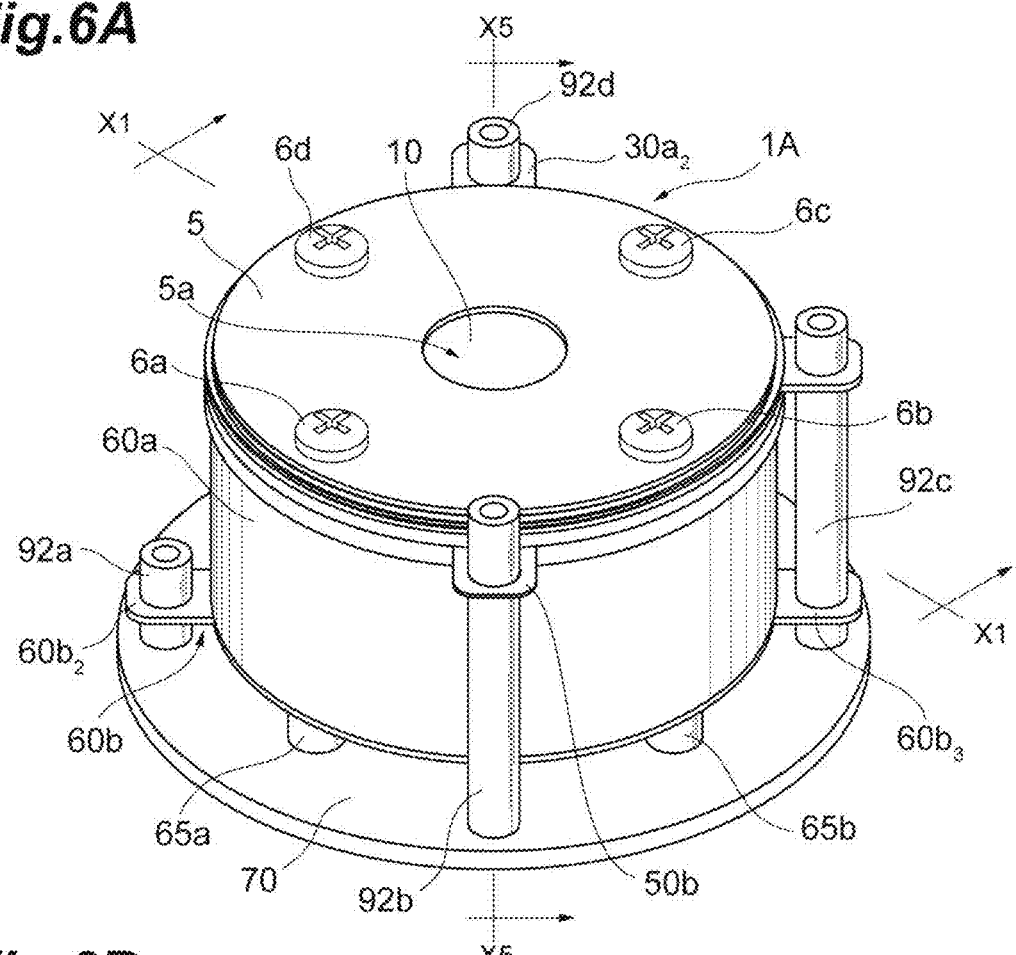
FIGS. 6A and 6B are a perspective view and a cross-sectional view of the charged particle detector according to the first embodiment.
Figure 6B:
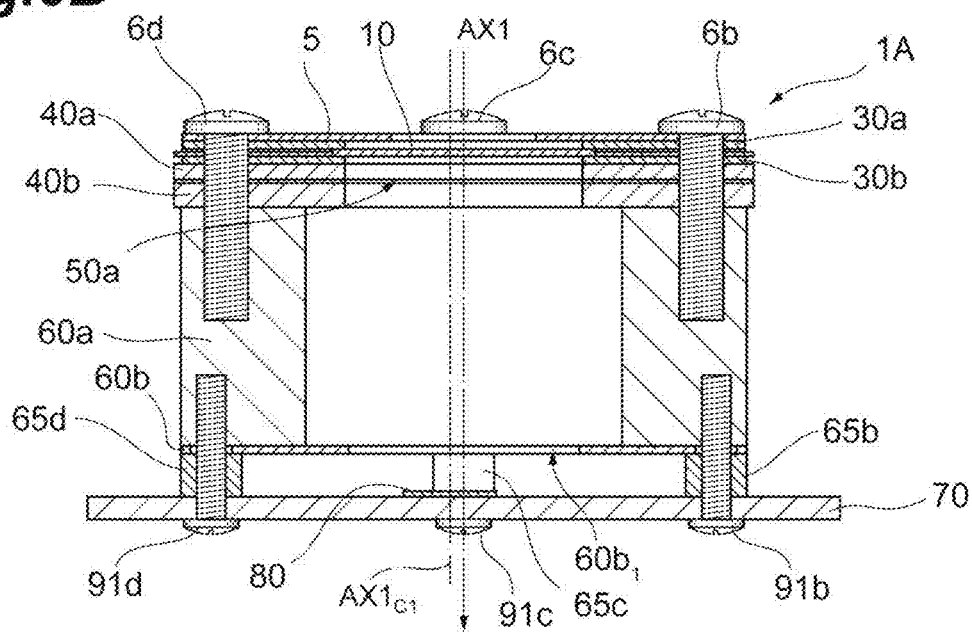

FIG. 5 is an assembly process chart of a charged particle detector 1A according to a first embodiment, and FIG. 6A is a perspective view of the charged particle detector 1A obtained through an assembly process illustrated in FIG. 5. FIG. 6B is a cross-sectional view of the charged particle detector 1A taken along line X1-X1 in FIG. 6A. Meanwhile, an axis $AX_{C1}$ illustrated in FIG. 6B is an axis passing through a center C1 of an electron incident surface 800 of a PD 80 and perpendicular to the electron incident surface 800 (an axis parallel to a central axis AX1 of an MCP 10).

In the assembly process of the charged particle detector 1A, a metal cap 5, an MCP input side electrode 30a (hereinafter referred to as MCP-In electrode), a spacer 20 including a through hole 20a for accommodating the MCP 10, an MCP output side electrode 30b (hereinafter referred to as MCP-Out electrode), an upper insulating ring 40a, a mesh electrode 50, a lower insulating ring 40b, and a focus electrode 60 are sequentially arranged in a direction from the MCP 10 to the focus electrode 60 (direction along the central axis AX1 of the MCP 10), and each of the metal cap 5, the MCP-In electrode 30a, the spacer 20, the MCP-Out electrode 30b, the upper insulating ring 40a, the mesh electrode 50, and the lower insulating ring 40b is fixed to the focus electrode 60 by means of four resin screws 6a to 6d. Furthermore, four spacers 65a to 65d and a bleeder circuit board 70 on which the PD 80 is mounted are sequentially arranged in a direction from the focus electrode 60 to the PD 80 (the direction along the central axis AX1 of the MCP 10) and each of the spacers 65a to 65d and the bleeder circuit board 70 is fixed to the focus electrode 60 by means of four resin screws 91a to 91d.

Specifically, the metal cap 5 is a metal disk including a window 5a for defining an effective region R (see FIG. 4B) of the MCP 10, and is provided with four screw holes for holding the resin screws 6a to 6d in a penetrating state so as to surround the window 5a.

The MCP 10 is interposed between the MCP-In electrode 30a and the MCP-Out electrode 30b in a state of being accommodated in the through hole 20a of the spacer 20 having a disk shape. At that time, the MCP-In electrode 30a is electrically connected to an electrode 13 formed on an input surface 10a of the MCP 10, and similarly the MCP-Out electrode 30b is electrically connected to the electrode 13 formed on an output surface 10b of the MCP 10. Meanwhile, the MCP-In electrode 30a includes an opening $30a_1$ for exposing the input surface 10a of the MCP 10 and a feeding unit $30a_2$ electrically connected to a feeding pin 92d at a predetermined voltage in order to set the MCP-In electrode 30a to have a predetermined potential. Furthermore, the MCP-In electrode 30a is provided with four screw holes for holding the resin screws 6a to 6d in a penetrating state so as to surround the opening $30a_1$. In contrast, the MCP-Out electrode 30b includes an opening $30b_1$ for exposing the output surface 10b of the MCP 10 and a feeding unit $30b_2$ electrically connected to a feeding pin 92c at a predetermined voltage in order to set the MCP-Out electrode 30b to have a predetermined potential. Furthermore, the MCP-Out electrode 30b is with four screw holes for holding the resin screws 6a to 6d in a penetrating state so as to surround the opening $30b_1$.

The mesh electrode 50 has a disk shape provided with an opening in which a metal mesh 50a is arranged and includes a feeding unit 50b electrically connected to a feeding pin 92b at a predetermined voltage in order to set the mesh electrode 50 to have a predetermined potential. The mesh electrode 50 is interposed between the upper insulating ring 40a provided with an opening $40a_1$ for exposing the metal mesh 50a and the lower insulating ring 40b provided with an opening $40b_1$ for exposing the metal mesh 50a. Meanwhile, the upper insulating ring 40a serves as an insulating spacer for electrically separating the MCP-Out electrode 30b from the mesh electrode 50 and the lower insulating ring 40b serves as an insulating spacer for electrically separating the mesh electrode 50 from the focus electrode 60. The upper insulating ring 40a and the lower insulating ring 40b are provided with four screw holes so as to surround the openings $40a_1$ and $40b_1$, respectively.

The focus electrode 60 has a cylindrical shape as a whole and has the central axis AX1 of the MCP 10 as an axial center. Specifically, the focus electrode 60 is formed of a hollow body portion 60a including a through hole $60a_1$ (defining an incident side opening of the focus electrode 60)

for allowing secondary electrons from the output surface 10b of the MCP 10 to pass, and a flange portion 60b including an opening 60$b_1$ for defining an emitting side opening of the focus electrode 60. The flange portion 60b is in contact with the hollow body portion 60a to be at the same potential and includes feeding units 60$b_2$ and 60$b_3$ electrically connected to feeding pins 92a and 92c at a predetermined voltage in order to set the flange portion 60b to have a predetermined potential. Meanwhile, four screw holes for the resin screws 6a to 6d are provided on an incident end side of the hollow body portion 60a so as to surround the through hole 60$a_1$, and four screw holes for the resin screws 91a to 91d are provided on an emitting end side thereof, so as to surround the through hole 60$a_1$. Four screw holes for the resin screws 91a to 91d are provided on the flange portion 60b so as to surround the opening 60$b_1$.

Four spacers 65a to 65d made of an insulating material are arranged between the flange portion 60b and the bleeder circuit board 70, and the spacers 65a to 65d are also provided with screw holes for allowing the resin screws 91a to 91d to pass through, respectively. The bleeder circuit board 70 is provided with the PD 80 mounted on a main surface thereof, and with the four feeding pins 92a to 92d for supplying predetermined voltages to the MCP-In electrode 30a, the MCP-Out electrode 30b, the mesh electrode 50, and the flange portion 60b. Meanwhile, the feeding pin 92c is electrically connected to the feeding unit 30$b_2$ of the MCP-Out electrode 30b and the feeding unit 60$b_3$ of the flange portion 60b for setting the MCP-Out electrode 30b and the flange portion 60b to have the same potential together with the hollow body portion 60a. On the bleeder circuit board 70, a sub miniature type A (SMA) connector for taking out a signal from the PD 80 is attached to a surface on a side opposite to the surface on which the PD 80 is mounted, and a bleeder circuit 90 for supplying predetermined voltages to the feeding pins 92a to 92d is fabricated.

The charged particle detector 1A according to the first embodiment is obtained by fixing the metal cap 5, the MCP-In electrode 30a, the spacer 20 accommodating the MCP 10, the MCP-Out electrode 30b, the upper insulating ring 40a, the mesh electrode 50, and the lower insulating ring 40b on the incident end side of the hollow body portion 60a (forming a part of the focus electrode 60) by means of the four resin screws 6a to 6d, and fixing the flange portion 60b, the four spacers 65a to 65d, and the bleeder circuit board 70 to the emitting end side of the hollow body portion 60a by means of the four resin screws 91a to 91d. Meanwhile, in order to prevent a feeding structure from being complicated, the focus electrode 60 is set to have the same potential as the output surface 10b of the MCP 10 in the first embodiment; however, the focus electrode 60 may also be set to have the same potential as the electron incident surface 800 of the PD 80. By making the potential of the focus electrode 60 the same as the potential of the output surface 10b of the MCP 10 or the PD 80 (electron incident surface 800) in this manner, the charged particle detector may be driven with smaller power.

Next, in the charged particle detector assembled in the above-described manner, eccentric arrangement of the PD 80 and eccentric arrangement of the opening 60$b_1$ in the flange portion 60b are described in detail with reference to FIGS. 7A to 12B.

First, FIG. 7A is a plan view illustrating a positional relationship between an MCP 10 and a PD 80 (a plan view of the MCP 10 as seen from an input surface 10a of the MCP 10) in a charged particle detector according to a comparative example. Such charged particle detector is obtained through an assembly process illustrated in FIG. 5. FIG. 7B corresponding to a cross-sectional view of the charged particle detector according to the comparative example taken along line X2-X2 in FIG. 7A illustrates equipotential lines and trajectories of secondary electrons in a space between the MCP 10 and the PD 80.

In the charged particle detector according to this comparative example, it is understood that a direction from a marker 14 toward a center of the MCP 10 is a bias angle direction by the marker 14 provided on the MCP 10. In contrast, the PD 10 is arranged such that a center C1 of an electron incident surface 800 and the center of the MCP 10 are coincident with each other, and an influence of a bias angle of the MCP 10 on the electron trajectories is not taken into consideration. Therefore, as illustrated in FIG. 7B, a focusing spot of the secondary electrons reaching a reference plane 100 from an output surface 10b of the MCP 10 deviates from a central axis AX1 of the MCP 10 and a part of the secondary electrons reaching the reference plane 100 is not received by the PD 80.

Figure 8A:
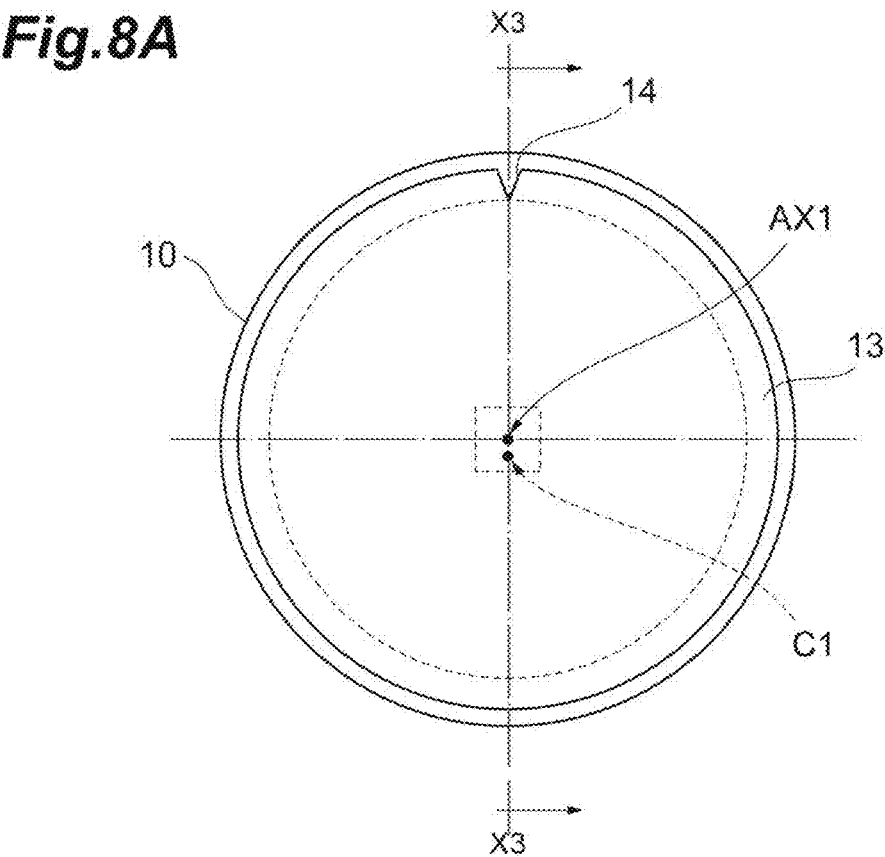
FIGS. 8A and 8B are views illustrating a positional relationship between an MCP and a PD and equipotential lines and trajectories of secondary electrons in a space between the MCP and the PD in the charged particle detector according to the first embodiment.
Figure 8B:
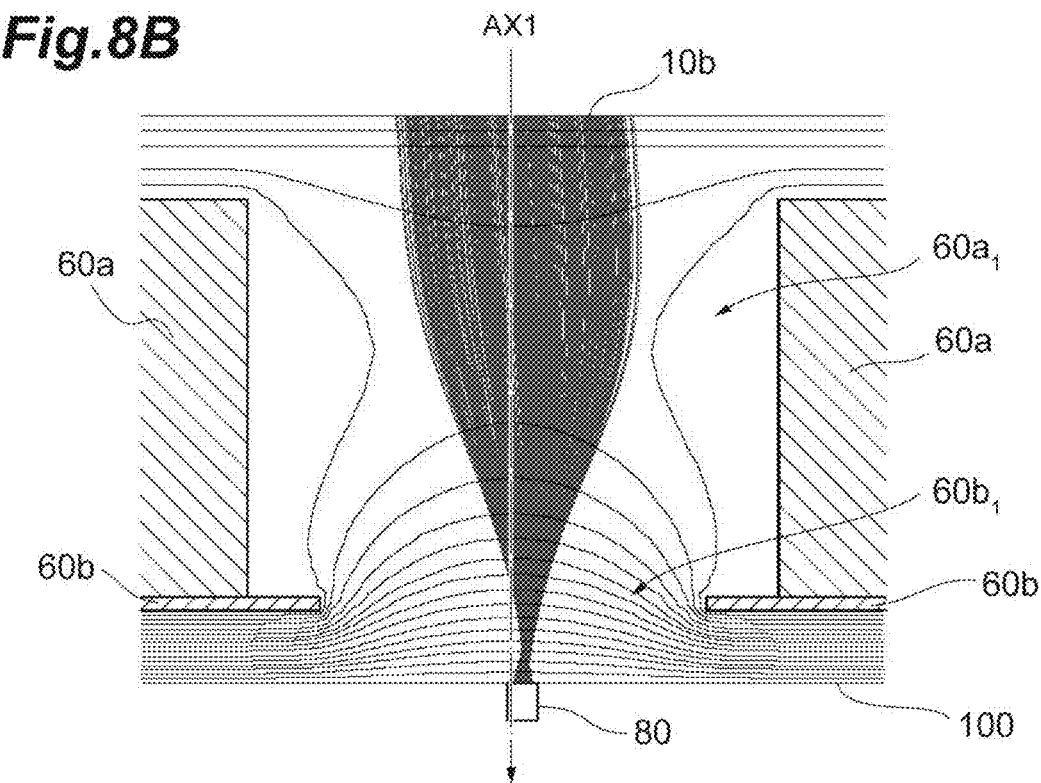

On the other hand, FIGS. 8A and 8B illustrate a case where the PD 80 is eccentrically arranged with respect to the central axis AX1 of the MCP 10 in an example of the charged particle detector 1A according to the first embodiment. That is, FIG. 8A is a plan view illustrating a positional relationship between the MCP 10 and the PD 80 (a plan view of the MCP 10 as seen from the input surface 10a of the MCP 10) as an example of the charged particle detector 1A of this example obtained through the assembly process illustrated in FIG. 5. FIG. 8B corresponding to a cross-sectional view of the charged particle detector 1A taken along line X3-X3 in FIG. 8A illustrates equipotential lines and trajectories of the secondary electrons in a space between the MCP 10 and the PD 80.

In the charged particle detector 1A according to this example, it is understood that a direction from a marker 14 toward a center of the MCP 10 is a bias angle direction by the marker 14 provided on the MCP 10, and the PD 10 is such that the center C1 of the electron incident surface 800 is arranged in the bias angle direction indicated by the marker 14. Therefore, as illustrated in FIG. 8B, even in a case where a focusing spot of the secondary electrons reaching the reference plane 100 from the output surface 10b of the MCP 10 deviates from the central axis AX1 of the MCP 10, a large part of the secondary electrons reaching the reference plane 100 is efficiently received by the PD 80. This configuration also enables application of a compact PD.

Figure 10B:
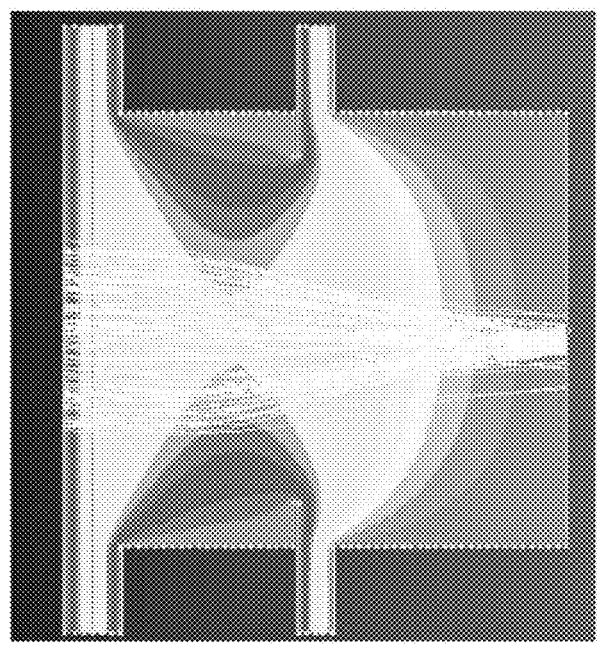
FIGS. 10A and 10B are views illustrating a specific structure and a simulation result of the trajectories of the secondary electrons for another example of the charged particle detector according to the first embodiment.
Figure 10A:
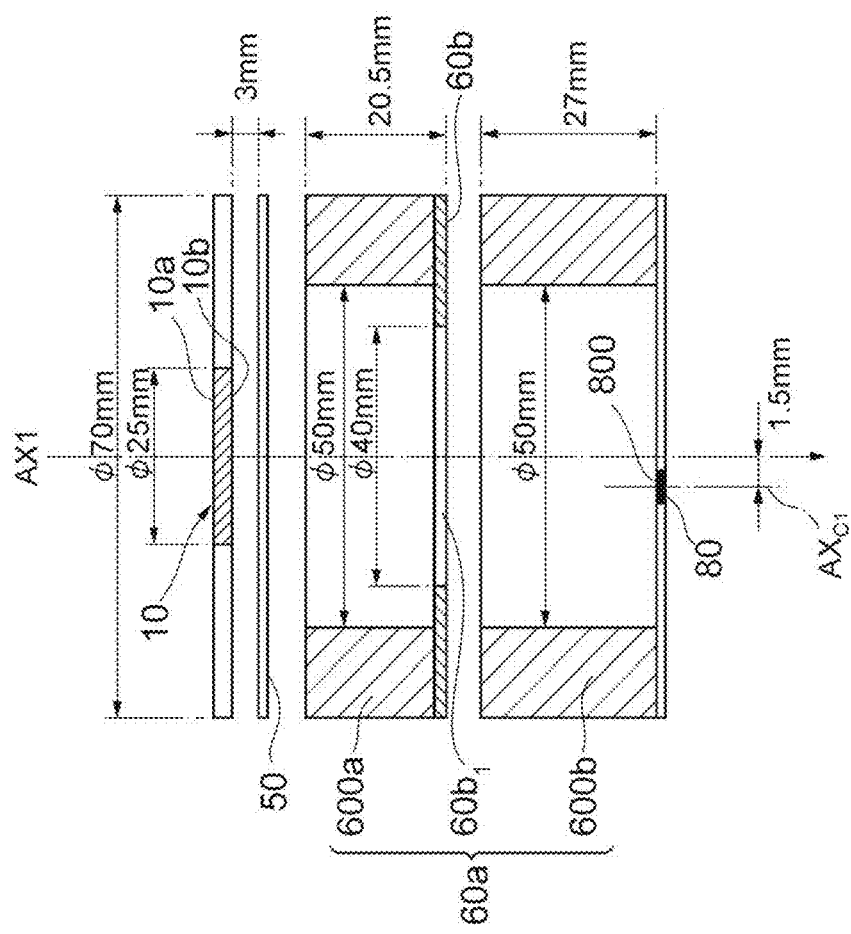

Subsequently, a more specific simulation result is illustrated regarding the example of the charged particle detector 1A (configuration in which the PD 80 is eccentrically arranged) illustrated in FIGS. 8A and 8B. FIGS. 9A to 10B are examples in which the PD 80 is eccentrically arranged with respect to the central axis AX1 of the MCP 10; the example of FIGS. 9A and 9B is the example of the charged particle detector in which the hollow body portion 60a forming a part of the focus electrode 60 is made of a single member. Especially, FIG. 9A illustrates a specific sectional cross-sectional structure of the charged particle detector including the hollow body portion 60a of the single member, and FIG. 9B illustrates the simulation result of the trajectories of the secondary electrons in the charged particle detector illustrated in FIG. 9A. On the other hand, FIGS. 10A and 10B illustrate the example of the charged particle detector in which the hollow body portion 60a forming a part of the focus electrode 60 is formed of a first body portion 600a (hollow member) located on an MCP 10 side and a second body portion 600b (hollow member) located on a PD 80 side. Especially, FIG. 10A illustrates a specific cross-sectional structure of the charged particle detector in which the hollow body portion 60a is constituted by the first body portion 600a and the second body portion 600b, and FIG. 10B illustrates the simulation result of the trajectories of the secondary electrons in the charged particle detector illustrated in FIG. 10A.

In the example of FIGS. 9A and 9B, as illustrated in FIG. 9A, a diameter of the effective region R in the MCP 10 is 10 mm. A thickness of the mesh electrode 50 is 0.5 mm. A distance between the MCP 10 and the mesh electrode 50 is 3 mm. In the focus electrode 60, an inner diameter of the hollow body portion 60a is 22 mm and a diameter of the opening $60b_1$ of the flange portion 60b is 16 mm. Meanwhile, a thickness of the flange portion 60b is 0.5 mm. An outer peripheral diameter of the hollow body portion 60a is 34 mm. In this example, an amount of deviation of the center C1 of the electron incident surface 800 of the PD 80 (in the drawing, $AX_{C1}$ represents a central axis of the electron incident surface 800) with respect to the central axis AX1 of the MCP 10 is 0.9 mm (FIG. 9B).

On the other hand, in the example of FIGS. 10A and 10B, the hollow body portion 60a of the focus electrode 60 is formed of the first body portion 600a arranged on the MCP 10 side and the second body portion 600b arranged on the PD 80 side. The first body portion 600a is set to have the same potential as the MCP-Out electrode 30b in a state of being in electrical contact with the flange portion 60b. The second body portion 600b is set to have the same potential as the PD 80 in a state in which the PD 80 is mounted on a side opposite to the first body portion 600a.

As illustrated in FIG. 10A, the diameter of the effective region R in the MCP 10 is 25 mm. A thickness of the mesh electrode 50 is 0.5 mm. A distance between the MCP 10 and the mesh electrode 50 is 3 mm. An inner diameter of the first body portion 600a forming a part of the hollow body portion 60a of the focus electrode 60 is 50 mm and the diameter of the opening $60b_1$ of the flange portion 60b is 40 mm. Meanwhile, a total thickness of the first body portion 600a and the flange portion 60b is 20.5 mm. A thickness of the second body portion 600b is 27 mm, and outer peripheral diameters of the first and second body portions 600a and 600b are both 70 mm. Furthermore, the amount of deviation of the center C1 of the electron incident surface 800 of the PD 80 (in the drawing, $AX_{C1}$ represents the central axis of the electron incident surface 800) with respect to the central axis AX1 of the MCP 10 is 1.5 mm (FIG. 10B).

(Second Embodiment)

FIGS. 11A to 12B are views for illustrating a configuration in which a center of an opening $60b_1$ in a flange portion 60b of a focus electrode 60 is eccentric with respect to a central axis AX1 of an MCP 10 in a configuration in which a PD 80 is arranged such that a center of an electron incident surface 800 is located on the central axis AX1 of the MCP 10 as a characteristic structure of a charged particle detector according to a second embodiment. Meanwhile, the configuration of the charged particle detector according to the second embodiment is similar to that of a charged particle detector 1A (FIGS. 5, 6A, and 6B) according to the first embodiment described above except for a structure of the flange portion 60b in the focus electrode 60.

Figure 11A:
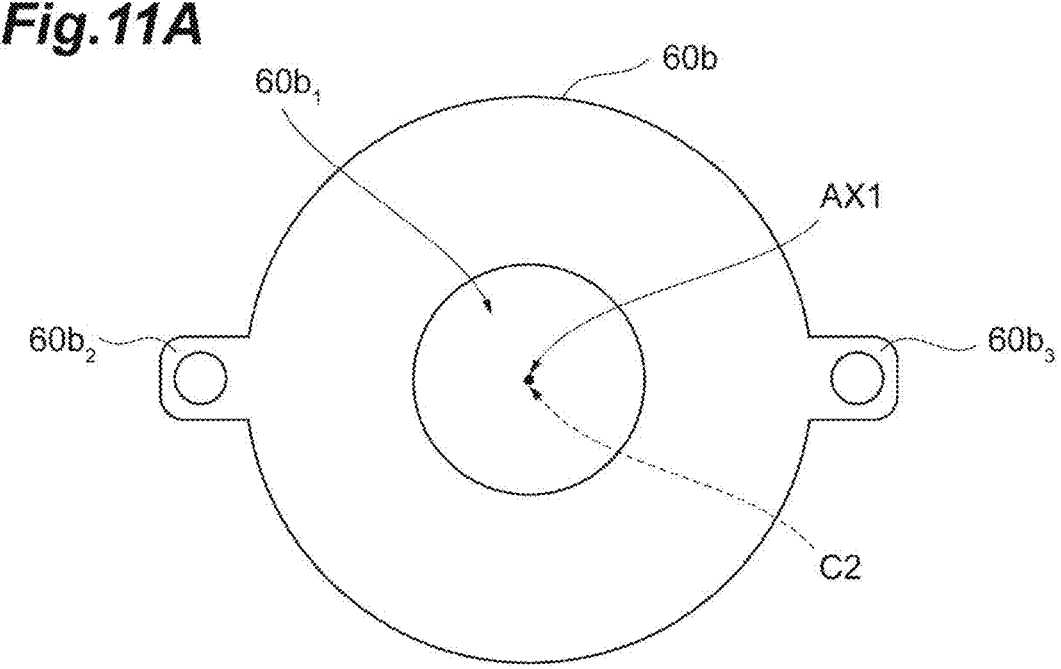
FIGS. 11A and 11B are views for illustrating a structure of a flange portion of a focus electrode in a charged particle detector according to a second embodiment.
Figure 11B:
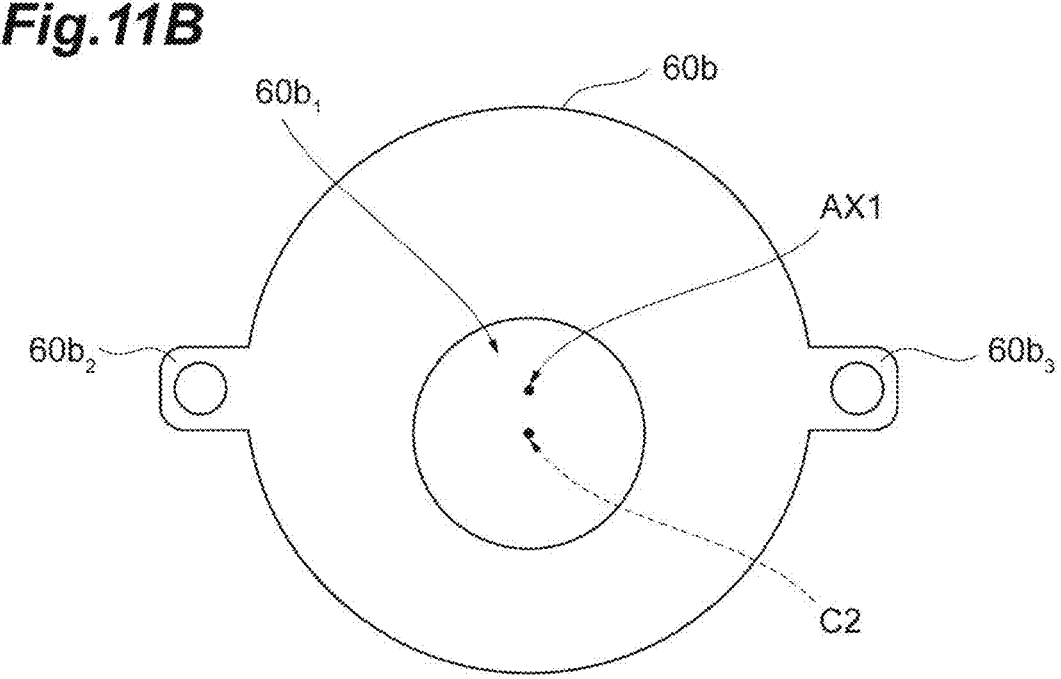

That is, FIGS. 11A and 11B are the views for illustrating the structure of the flange portion 60b in which the center of the opening $60b_1$ is eccentric with respect to the central axis AX1 of the MCP 10 in the focus electrode 60 as a characteristic configuration of the charged particle detector according to the second embodiment. Normally, the opening $60b_1$ of the flange portion 60b is formed such that the central axis AX1 of the MCP 10 is coincident with a center C2 of the opening $60b_1$ when the charged particle detector is assembled as illustrated in FIG. 11A. However, in the second embodiment, as illustrated in FIG. 11B, the center C2 of the opening $60b_1$ is eccentric with respect to the central axis AX1 of the MCP 10 in a bias angle direction indicated by a marker 14 of the MCP 10.

Figure 12A:
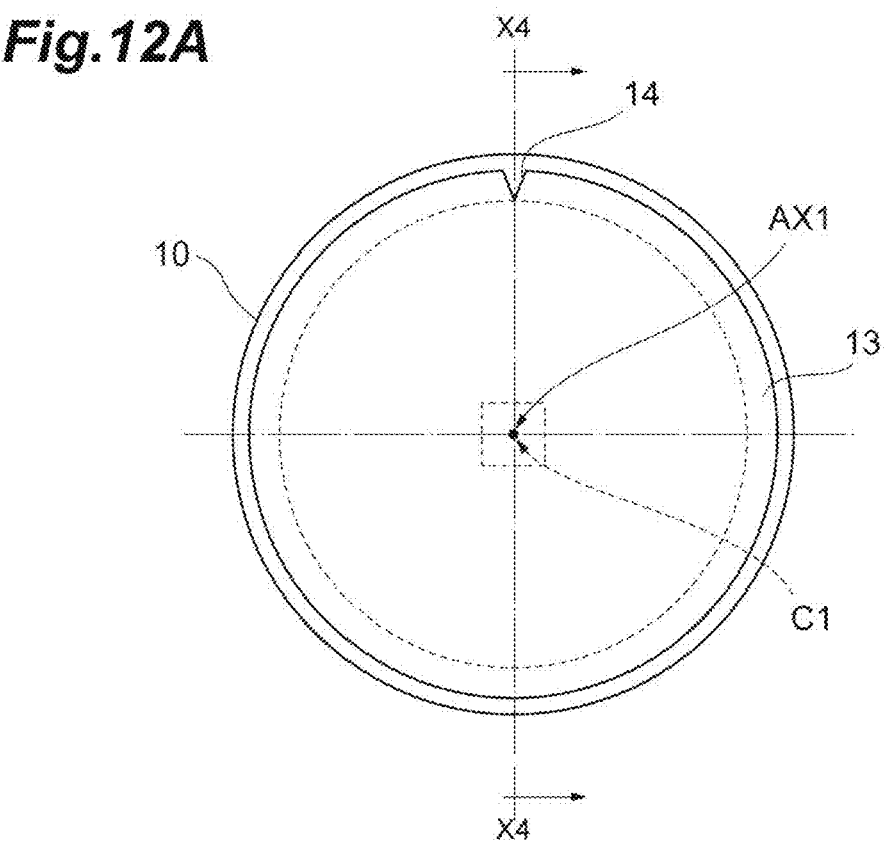
FIGS. 12A and 12B are views illustrating a positional relationship between an MCP and a PD and equipotential lines and trajectories of secondary electrons in a space between the MCP and the PD in an example of the charged particle detector according to the second embodiment.
Figure 12B:
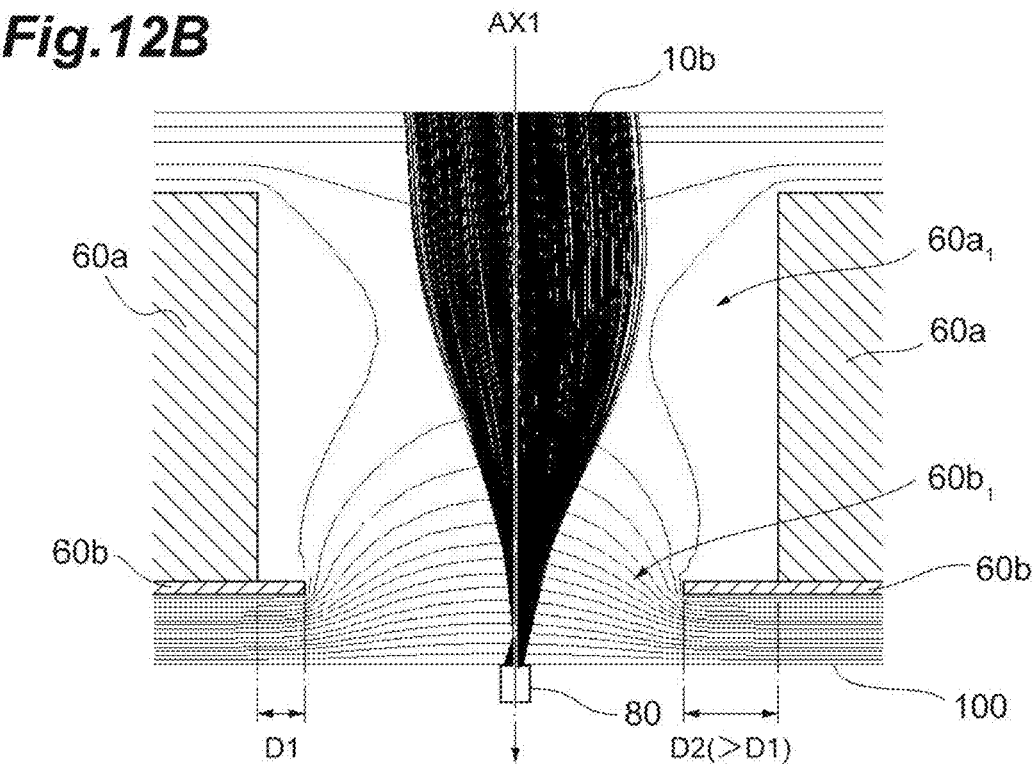

In the above-described configuration, a positional relationship between the MCP 10 and the PD 80 is illustrated in FIG. 12A, and equipotential lines and trajectories of secondary electrons in a space between the MCP 10 and the PD 80 are illustrated in FIG. 12B. Meanwhile, FIG. 12A is a plan view of the MCP 10 as seen from an input surface 10a side of the MCP 10, and FIG. 12B corresponds to a cross-sectional view of the charged particle detector taken along line X4-X4 in FIG. 12A. As is understood from FIG. 12B, the charged particle detector according to the second embodiment has a structure in which one side (a left side in FIG. 12B) of the flange portion 60b projects in a through hole $60a_1$ of a hollow body portion 60a by a length D1 and the other side (a right side in FIG. 12B) of the flange portion 60b projects by a length D2 (>D1), and as a result, a state in which the center C2 of the opening 60b1 is eccentric with respect to the central axis AX1 of the MCP 10 in the bias angle direction indicated by the marker 14 of the MCP 10 is realized.

That is, as illustrated in FIG. 12B, the trajectories of the secondary electrons emitted from an output surface 10b of the MCP 10 are temporarily greatly eccentric in the bias angle direction due to an influence of the bias angle of the MCP 10, but it is adjusted that a position of a focusing spot of the secondary electrons approaches a central axis AX1 side of the MCP 10 by the opening $60b_1$ of the flange portion 60b.

(Third Embodiment)

FIGS. 13A and 13B are views for illustrating a cross-sectional structure of a charged particle detector according to a third embodiment, and a charged particle detector 1B according to the third embodiment has a structure similar to that of a charged particle detector 1A according to the first embodiment described above except for a connecting structure between a focus electrode 60 and a bleeder circuit board 70. That is, the charged particle detector 1B according to the third embodiment is aimed to improve maintenance work in a situation in which this is fixed to a vacuum chamber of a mass spectroscope and the like and has a structure in which only a PD 80 may be easily replaced. Meanwhile, FIG. 13A is a cross-sectional view illustrating a configuration of the charged particle detector 1B according to the third embodiment attached to an opening 210 of a vacuum chamber 200. FIG. 13B is a cross-sectional view illustrating a state in which only a bleeder circuit board 70 on which the PD 80 is mounted is removed from the vacuum chamber 200. FIGS. 13A and 13B corresponding to cross-sectional views taken along line X5-X5 of FIG. 6A, and an axis $AX_{C1}$ in the drawings is an axis passing through a center C1 of an electron incident surface 800 of the PD 80 and perpendicular to the electron incident surface 800 (an axis parallel to the central axis AX1 of the MCP 10).

Generally, gain deterioration (life end) of the charged particle detector is mainly due to a decrease in electron implantation gain of the PD 80. When ions are detected by the charged particle detector 1B, electrons applied to the PD 80 cause deposition of amorphous carbon on the PD 80. Therefore, in a configuration obtained by combination of the MCP 10 and the PD 80 reaching the life end, the gain may be recovered by replacing only the PD 80.

As illustrated in FIG. 13A, a device upper stage including the MCP 10 and the focus electrode 60 of the charged particle detector 1B is fixed to a resin flange (insulating flange) 300 installed outside the vacuum chamber 200 so as to surround the opening 210 by means of four resin screws (only two resin screws 91b and 91d are illustrated in FIG. 13A) in a state of being inserted into the opening 210 of the vacuum chamber 200. Furthermore, a device lower stage including the bleeder circuit board 70 on which the PD 80 is mounted is fixed to the resin flange 300 from the outside of the vacuum chamber 200 by means of four resin screws (only 93b and 93d are illustrated in the drawing). Meanwhile, feeding pins 92a to 92d for driving the charged particle detector 1B and a SMA connector 95 for outputting signals are attached to the bleeder circuit board 70, and they serve as a vacuum flange.

With the above-described configuration, the device upper stage is located inside (a vacuum side of) the vacuum chamber 200, and the device lower stage is located outside (an atmosphere side of) the vacuum chamber 200. Meanwhile, an O-ring 350 for sealing is attached to a contact portion between the vacuum chamber 200 and the resin flange 300 in order to maintain airtightness in the vacuum chamber 200. For the similar reason, the O-ring 350 is also attached between the resin flange 300 and the bleeder circuit board 70.

When replacing the PD 80 from a state in which the charged particle detector 1B is attached to the opening 210 of the vacuum chamber 200 in the above-described manner (FIG. 13A), by removing the resin screws 93b and 93d from the resin flange 300 as illustrated in FIG. 13B, it becomes possible to separate the bleeder circuit board 70 on which the PD 80 is mounted from the vacuum chamber 200. After the separation, a procedure opposite to the above-described separation operation is performed, that is, the detached bleeder circuit board 70 is replaced by another bleeder circuit board on which a normally operable PD 80 is mounted to be attached to the resin flange 300 by means of the resin screws 93b and 93d.

From the above description of the present invention, it is obvious that the present invention may be variously modified. Such modifications cannot be regarded as departing from the spirit and scope of the present invention and improvements obvious to all those skilled in the art are included in following claims.

REFERENCE SIGNS LIST

1, 1A, 1B . . . Charged particle detector; 10 . . . MCP (microchannel plate); 12 . . . Through hole; 121 . . . Secondary electron emission surface; 30a . . . MCP input side electrode (MCP-In); 30b . . . MCP output side electrode (MCP-Out); 50 . . . Mesh electrode; 60 . . . Focus electrode, 60a . . . Hollow body portion; 600a . . . First body portion; 600b . . . Second body portion; 60b . . . Flange portion; 60b$_1$ . . . Opening; 80 . . . PD (electron impact diode); 800 . . . Electron incident surface; and 70 . . . Bleeder circuit board (board).

The invention claimed is:

1. A charged particle detector comprising:
a microchannel plate having: an input surface on which charged particles are incident; an output surface from which secondary electrons are emitted; and a plurality of through holes each communicating the input surface with the output surface and having a secondary electron emission surface on an inner wall thereof, the plurality of through holes arranged such that a central axis of each is inclined at least by a bias angle defined by an acute angle with respect to the output surface;
an electron impact diode arranged so as to face the microchannel plate and having an electron incident surface whose area is smaller than an area of an effective region of the microchannel plate; and
a focus electrode provided between the microchannel plate and the electron impact diode, the focus electrode having a shape to continuously surround trajectories of the secondary electrons directed from the microchannel plate to the electron impact diode,
wherein, where a bias angle direction is, on a reference plane coincident with the electron incident surface, defined as a direction from an intersection between a reference axis and the reference plane to an intersection between a central axis of a reference through hole and the reference plane, the reference axis passing through a center of an opening coincident with the output surface out of openings of the reference through hole and orthogonal to the output surface, the reference through hole selected from the plurality of through holes,
the electron impact diode is eccentrically arranged such that, with respect to an intersection between a central axis of the microchannel plate and the reference plane, a center of the electron incident surface deviates by a predetermined distance in the bias angle direction, the central axis of the microchannel plate being an axis passing through a center of the effective region and orthogonal to the output surface.

2. The charged particle detector according to claim 1, wherein the focus electrode is set to have the same potential as the output surface of the microchannel plate.

3. The charged particle detector according to claim 1, wherein the focus electrode is set to have the same potential as the electron incident surface of the electron impact diode.

4. The charged particle detector according to claim 1, further comprising:
a mesh electrode provided between the microchannel plate and the focus electrode.

5. The charged particle detector according to claim 1, wherein a maximum width of the electron incident surface in the electron impact diode is 3 mm or shorter.

6. The charged particle detector according to claim 1, wherein a spot diameter of the secondary electrons reaching the electron incident surface of the electron impact diode from the output surface of the microchannel plate is 1 mm or shorter.

7. The charged particle detector according to claim 1, wherein the focus electrode is constituted by: a body portion continuously surrounding the trajectories of the secondary electrons directed from the microchannel plate to the electron impact diode; and a flange member for defining a center position and a size of the second opening.

8. The charged particle detector according to claim 7, wherein the body portion is constituted by a plurality of hollow members sequentially arranged from the microchannel plate to the electron impact diode.

9. The charged particle detector according to claim 1, further comprising:
a board on a main surface of which the electron impact diode is mounted; and a resin flange having an opening for allowing the secondary electrons directed from the microchannel plate to the electron impact diode to pass therethrough, the resin flange arranged between the focus electrode and the board.

10. A charged particle detector comprising:
a microchannel plate having: an input surface on which charged particles are incident; an output surface from which secondary electrons are emitted; and a plurality of through holes each communicating the input surface with the output surface and having a secondary electron emission surface on an inner wall thereof, the plurality of through holes arranged such that a central axis of each is inclined at least by a bias angle defined by an acute angle with respect to the output surface;
an electron impact diode arranged so as to face the microchannel plate and having an electron incident surface whose area is smaller than an area of an effective region of the microchannel plate; and
a focus electrode provided between the microchannel plate and the electron impact diode, the focus electrode having: a first opening located on a side of the microchannel plate; a second opening located on a side of the electron impact diode; and a shape to continuously surround trajectories of the secondary electrons directed from the microchannel plate to the electron impact diode,
wherein, where a bias angle direction is, on a reference plane coincident with the electron incident surface, defined as a direction from an intersection between a reference axis and the reference plane to an intersection between a central axis of a reference through hole and the reference plane, the reference axis passing through a center of an opening coincident with the output surface out of openings of the reference through hole and orthogonal to the output surface, the reference through hole selected from the plurality of through holes,
at least a part of the focus electrode is eccentrically arranged such that, with respect to an intersection between a central axis of the microchannel plate and the reference plane, a center of the second opening deviates by a predetermined distance in the bias angle direction, the central axis of the microchannel plate being an axis passing through a center of the effective region and orthogonal to the output surface.

11. The charged particle detector according to claim 10, wherein the focus electrode is set to have the same potential as the output surface of the microchannel plate.

12. The charged particle detector according to claim 10, wherein the focus electrode is set to have the same potential as the electron incident surface of the electron impact diode.

13. The charged particle detector according to claim 10, further comprising:
a mesh electrode provided between the microchannel plate and the focus electrode.

14. The charged particle detector according to claim 10, wherein a maximum width of the electron incident surface in the electron impact diode is 3 mm or shorter.

15. The charged particle detector according to claim 10, wherein a spot diameter of the secondary electrons reaching the electron incident surface of the electron impact diode from the output surface of the microchannel plate is 1 mm or shorter.

16. The charged particle detector according to claim 10, wherein the focus electrode is constituted by: a body portion continuously surrounding the trajectories of the secondary electrons directed from the microchannel plate to the electron impact diode; and a flange member for defining a center position and a size of the second opening.

17. The charged particle detector according to claim 16, wherein the body portion is constituted by a plurality of hollow members sequentially arranged from the microchannel plate to the electron impact diode.

18. The charged particle detector according to claim 10, further comprising:
a board on a main surface of which the electron impact diode is mounted; and
a resin flange having an opening for allowing the secondary electrons directed from the microchannel plate to the electron impact diode to pass therethrough, the resin flange arranged between the focus electrode and the board.

* * * * *